United States Patent [19]

Segsworth

[11] 4,037,043
[45] July 19, 1977

[54] EXTENDED ARC FURNACE AND PROCESS FOR MELTING PARTICULATE CHARGE THEREIN

[75] Inventor: Robert Sidney Segsworth, Toronto, Canada

[73] Assignee: Tibur Metals, Ltd., Toronto, Canada

[21] Appl. No.: 580,838

[22] Filed: June 2, 1975

[30] Foreign Application Priority Data

Apr. 16, 1975 Canada ................................. 224742

[51] Int. Cl.² .............................................. H05H 1/00
[52] U.S. Cl. .................................................. 13/9 R
[58] Field of Search .................. 13/9 P, 18, 33, 2, 2 P

[56] References Cited

U.S. PATENT DOCUMENTS

| 1,193,783 | 8/1916 | Hillhouse | 13/18 |
| 3,101,385 | 8/1963 | Robinson | 13/18 X |
| 3,105,864 | 10/1963 | Robinson | 13/9 |
| 3,524,006 | 8/1970 | Ebeling et al. | 13/9 UX |
| 3,723,630 | 3/1973 | Paton et al. | 13/9 X |
| 3,749,802 | 7/1973 | Camacho | 13/9 X |
| 3,830,950 | 8/1974 | Schoumaker et al. | 13/9 |

Primary Examiner—R. N. Envall, Jr.

[57] ABSTRACT

The furnace and process disclosed herein comprise an electric arc furnace having at least one electrode with an axial opening therein through which an appropriate gas is fed into the arc thereby permitting a stabilized extended arc to be produced. The axial opening or openings are of a predetermined selective size to create a stabilized extended arc according to the flow rate and linear velocity of gas flowing through the opening or openings. The furnace may be used for the melting of metals, glass, etc. and for various modifications or reactions of the molten material wherein solid modifiers or reagents are added to the melt.

8 Claims, 5 Drawing Figures

EXTENDED ARC FURNACE AND PROCESS FOR MELTING PARTICULATE CHARGE THEREIN

BACKGROUND OF THE INVENTION

1. Field of the Invention:

This invention relates to electric arc furnaces. More specifically it relates to electric arc furnaces in which at least one of the electrodes has an axial opening of appropriate size so that a gas, such as argon, may be introduced into the interior of the arc at an appropriate rate to produce a stabilized, extended arc.

2. Related Prior Art:

In an article on "Arc-furnace Melting" by J. A. Charles and A. G. Cowen which was published on Feb. 12, 1960 in Iron and Coal Trades Review (pp. 353–358), the authors describe the feeding of argon through hollow electrodes in an arc furnace used for melting. The operation is compared with the use of solid electrodes and identical conditions apparently including electrode spacing is used as with the solid electrodes. While certain improvements were noted with argon, no attempt was made to produce an extended arc.

A later article (J. Ravenscroft "Electrical Review" pp. 413–418, Sept. 14, 1962) describes the testing of argon introduction through electrode openings in a 5 ton arc furnace. The authors conclude "As shown from the results, furnace performance, as assessed by melting rate, electricity consumption to clearmelt, and electrode consumption, was not improved by using argon during melting on the 5 ton furnace." . . . "There appears to be no practical application for argon in the production furnace, because the increase in arc power which results from an increase of electrical conductivity in the arcs can easily be attained in practice (if desired) by increasing the current settings of the electrode regulator."

U.S. Pat. No. 3,783,167 discloses a cumbersome mechanical device design to produce an extended arc zone by moving an electrode or a plasma gun in a closed path so that the resultant arc with a second annular electrode would be moved into a greater area. In addition to being cumbersome and difficult to maneuver, this equipment has proven to be quite inefficient as a heating or melting device.

U.S. Pat. No. 3,834,895 shows a process using a plasma arc furnace. A gas such as argon is fed into the furnace through an annular passageway surrounding either the electrode or a hopper feeding particulate material into the plasma. In this case, particulate iron-bearing material is dropped into the plasma from a hopper situated immediately above the furnace. The patentee stresses as novel the feature of collecting the melted iron at the bottom of the furnace and removing it in a molten form.

U.S. Pat. No. 2,909,422 uses a hollow electrode in an arc furnace to introduce inert gases, such as argon, to reduce hydrogen pickup, to minimize updraft in the hollow electrode and to reduce the heating period of the furnace. Patentee states "The stream of gas material leaving the bore of the furnace electrode impinges directly upon the surface of the melt, and its velocity produces a stirring or agitating effect in the melt region under the electrode, thereby shortening the reaction time between the melt ingredients and the slag, such as in the case of steel melting, and considerably shortening the refinement period." . . . "By supplying argon through the electrode bore, the moisture in the furnace atmosphere is displaced in the arcing region, which being the hottest part of the furnace is the most likely place for the hydrogen transfer mechanism to occur. An increased rate of argon flow will naturally displace more moisture laden air from the arcing region and consequently will be more likely to prevent the incorporation of hydrogen in the melt."

U.S. Pat. No. 3,105,864 discloses an electric arc furnace having an electrode with an axial opening and an outer coating on the electrode of higher melting point than the remainder of electrode so that when gas is passed through the axial opening the tip of the opening will wear into an enlarged tip or cone at the exit end of the electrode. Patentee is obviously unaware of the possibility of stabilizing and extending the arc by controlling the rate of gas flow and the linear velocity of gas passing through the opening.

STATEMENT OF THE INVENTION

In accordance with this invention it has been found that improvements in operation and in economy for the melting or reaction of a charge, such as iron, steel, glass, etc., can be effected by the arc furnace design and process for operation which are described herein. The improved design is based primarily on the stabilized extended arc made possible by the incorporation of at least one electrode having an axial opening through which an appropriate gas, such as argon, is fed into the arc. The size of the opening in the electrode or electrodes is selected to give an appropriate rate of gas flow therethrough by which the extended arc is stabilized. The furnace power may be controlled by modulating the rate of gas flow or by modifying the composition of the gas supplied.

It has been found that this stabilized extended arc operation results in (1) reduced electrode consumption, (2) improved power factor, (3) improved heat transfer, (4) improved power control, (5) reduced refractory wear, and (6) reduced acoustical and electrical noise.

The presence of the gas in the interior of the arc allows the arc to be extended by increase of the distance between arcing electrodes or between an electrode and the melt in the hearth, and imparts to the extended arc a stability not attainable by other means. Prior art arcs are erratic in performance, must be maintained at relatively short lengths, and are not capable of being extended to the degree and with the stability attained in the furnace of this invention.

In establishing the stabilized extended arc, the electrode is spaced from a second electrode or from material in the hearth the short distance normally used in initiating an arc with solid electrodes. Then the electrical power is applied to initiate the arc, following which the gas flow through the electrode is started. The resulting ionization of the gas in the arc lowers the electrical resistance and the electrode is then withdrawn at least double and generally many times more the original length of the arc. In a typical case the normal arc with solid electrodes could be about ½ inch to 1 inch whereas the extended stabilized arc of this invention may go up to 6 inches in length.

If the gas is introduced in any manner other than through the axial opening in the electrode the resultant arc does not have the stabilized extending effect accomplished by feeding in through the axial opening. When the arc is between two or more electrodes, it is only necessary to have an opening in one electrode although it may be preferred to have openings in more than one and even in all the electrodes. When the arc is between a series of two or more electrodes and conductive material in the hearth, it is preferable to have axial openings in each of the electrodes.

The number of electrodes and the arrangements thereof will vary according to the size and capacity of the furnace. For example it is possible to have a considerable number of electrodes set in a horizontal plane with half the electrodes extending inwardly from one side of the furnace and the other half extending inwardly from the opposite side. With the arcs extending between each opposing pair of electrodes, a considerable stabilized, extended arc volume may be formed of a large horizontal pattern. Where it may be desirable to extend the arc area vertically it is possible to arrange pairs of electrodes horizontally opposed from each other but at different heights so that one or more pairs may be vertically positioned over one or more other pairs and so that the resultant stabilized extended arc may have a greater vertical dimension.

Among the advantages of this furnace are:

1. Reduced electrode consumption — Once the arc has become stabilized and the extended spacing effected, the electrode consumption is reduced drastically.

2. Improved power factor — As soon as stable operation is achieved, it is no longer necessary to maintain a large series reactance in the power circuit and therefore the power factor can be raised from the usual 70-75% to substantially unity.

3. Improved heat transfer — With the wide electrode tip spacing made possible by this technique the arc tends to become soft and diffused over a much greater volume, as compared to the very intense and relatively small volume of the conventional arc.

4. Power control — In addition to the methods available in conventional arc furnace operation for the modulation of power by changing the electrode tip spacing and by changing the voltage applied to the electrodes, power may also be modulated, without moving the electrode or changing the voltage, merely by changing the rate of gas flow to the arc, or by changing the consumption of the gas fed to the arc.

5. Lower refractory wear — With the softer nature of the arc, there is much less attack on the refractory as well as less "burning" or volatilization of the charge.

SPECIFIC EMBODIMENTS OF THE INVENTION

The furnace of this invention is probably more easily described by reference to the drawings.

Figure 1:
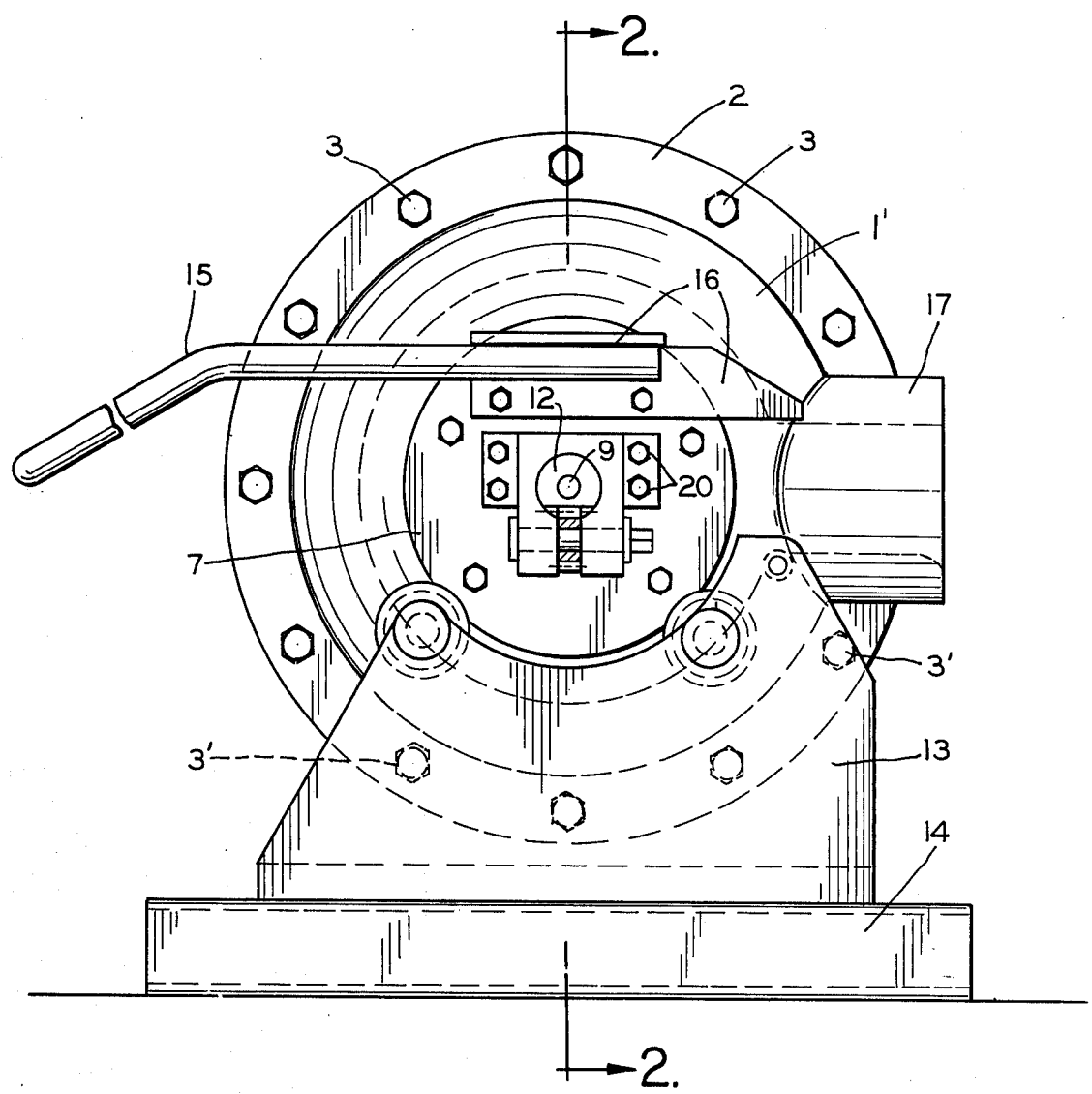
FIG. 1 is a side elevational view of an essentially spherical furnace.
Figure 2:
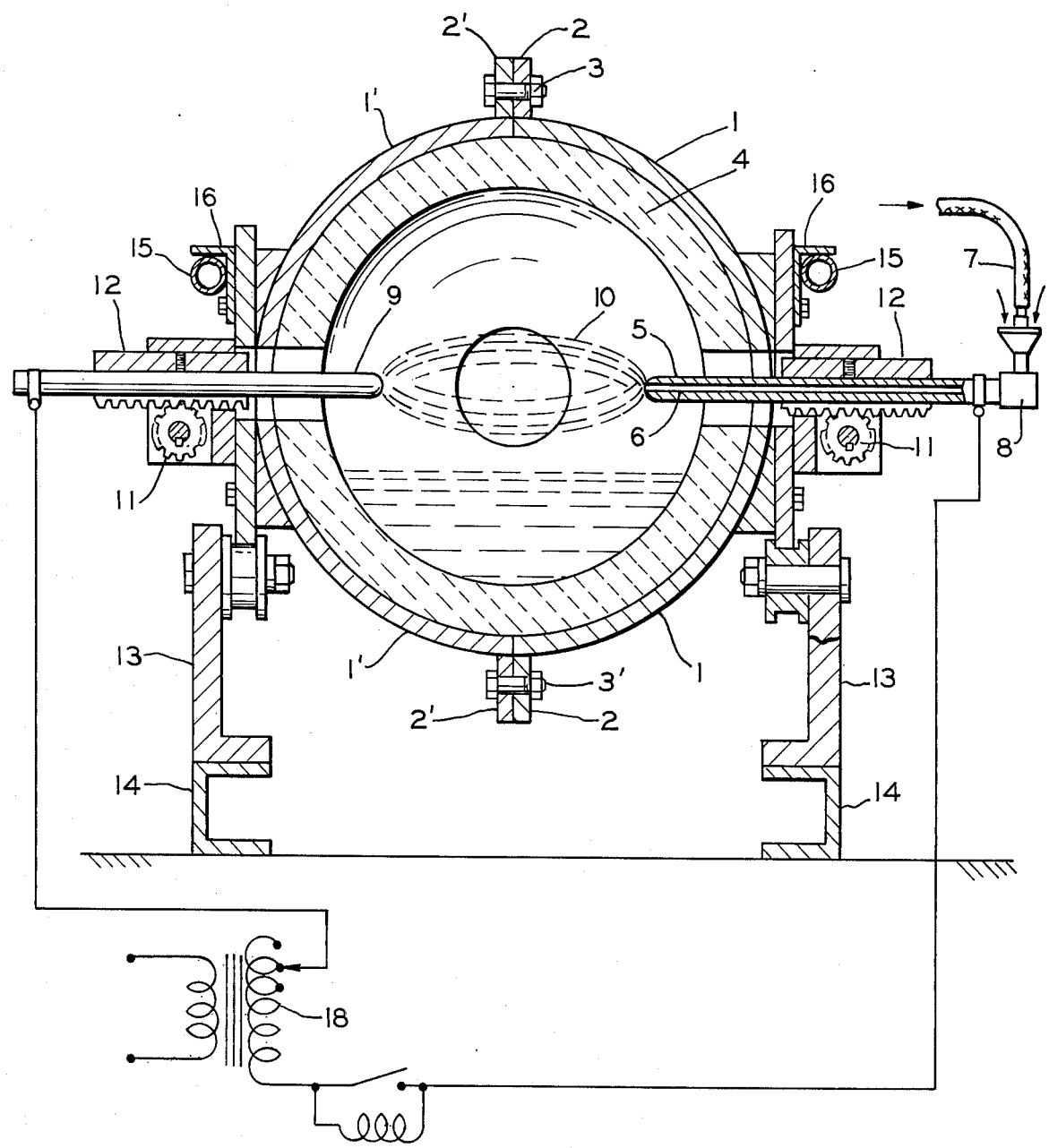
FIG. 2 is a front sectional view taken at line 2—2 of FIG. 1.

In FIGS. 1 and 2, the outer spherical shell 1 and 1' is in two parts held together by flanges 2 and 2' and fastened by bolts 3 and 3'. This shell has a refractory inner lining 4. Electrode 5 has an opening 6 therein through which a gas such as argon is fed into the interior of the furnace as fed to the electrode from supply 7 through connector 8. The gas (argon) stream is directed to an opposing electrode 9 which may or may not have an opening therein. In either case the gas from the electrode opening or openings is fed into the interior of the arc 10. The positioning of the electrodes so as to increase or decrease the distance between them is effected by rotation of either or both of sprocket wheels 11 whose teeth fit into notches on the bottom of insulating supports 12. The furnace is attached to and supported by flanges 13 and base 14. The furnace may be tilted on the base 14 by pressure applied upward on arms 15 which are fastened to the furnace shell by flanges 16. In a tilted position molten material may be poured from the furnace through opening 17. Power is supplied to the electrodes by power source 18.

Figure 3:
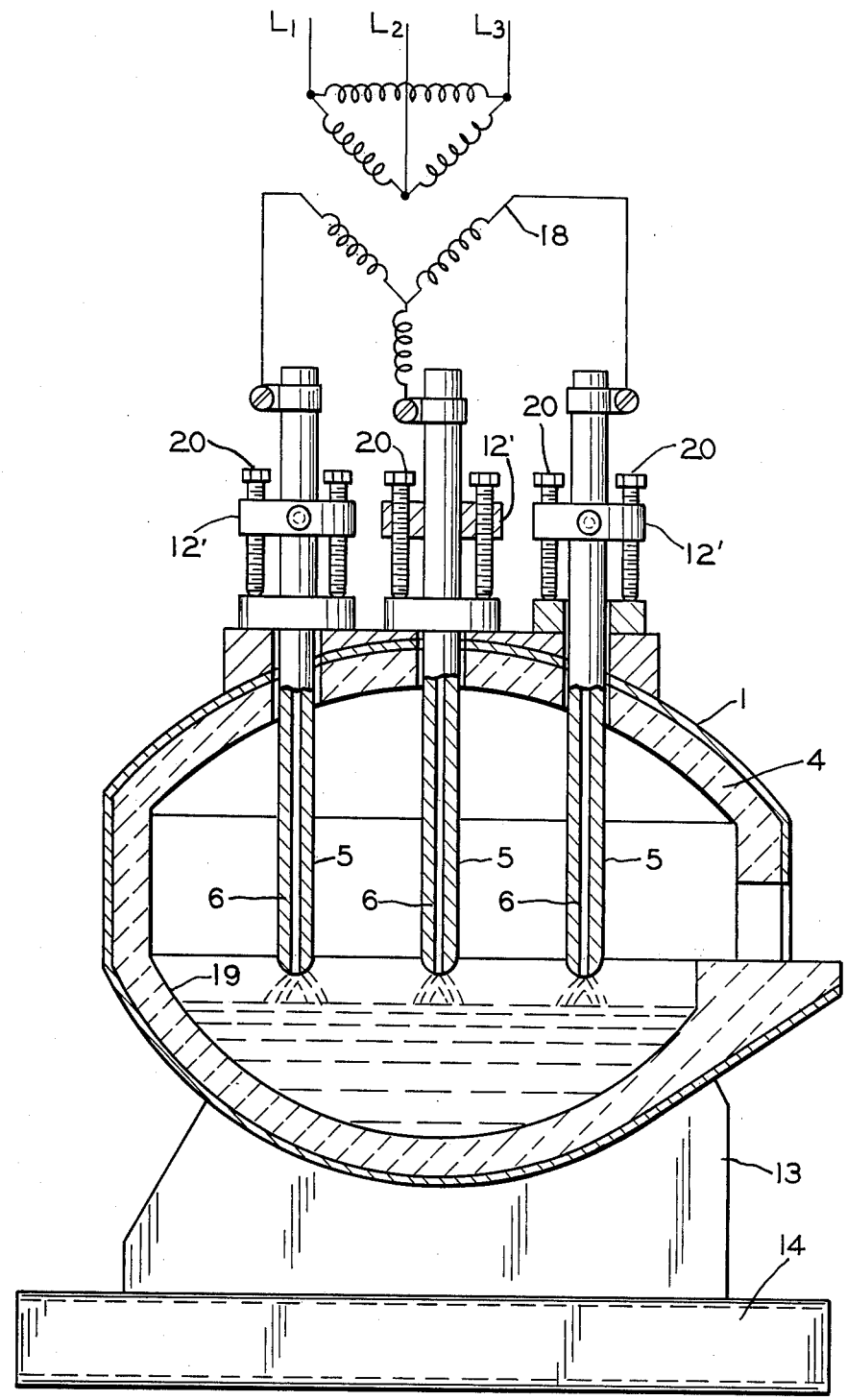

FIG. 3 is a sectional side view of another modification of the furnace of this invention, in which three electrodes 5 as shown extend vertically downward toward the hearth 19. Shell 1 has an inner refractory lining 4 and is supported by flange 13 on base 14. The electrodes are held by insulating supports 12 which are in turn supported by bolts 20. The positioning of the electrodes to shorter or greater distances from the hearth 19 and the contents thereof is effected by the turning of bolts 20. Each of the electrodes as shown has an opening 6 therethrough to which a gas supply (not shown) may be connected. Power is supplied through power source 18.

Figure 4:
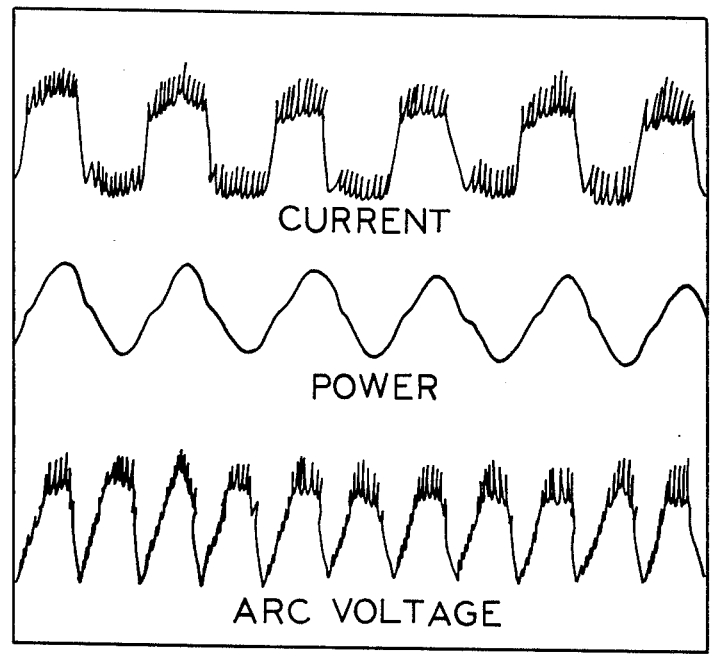

FIG. 4 shows oscillographic recordings for current, power and arc voltage for conventional arc mode of operation in a furnace of the type shown in FIG. 1.

Figure 5:
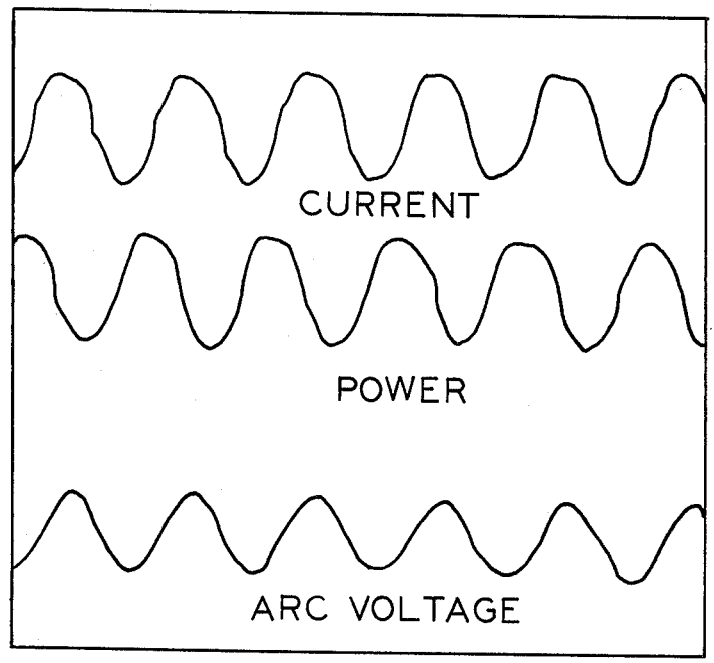

FIG. 5 shows corresponding oscillographic recordings for the stabilized extended type of operation of this invention with an argon flow rate of 3 cu. ft. per hour and power of 15 kw.

The electrodes are preferably made of carbon or graphite, although other suitable materials may be used such as tungsten and the size may be whatever is appropriate to accommodate the size and design of furnace being used. The electrode opening must be present in one and may be in more or all of the electrodes. The electrodes may be positioned horizontally, vertically or inclined and they may be arranged so that the arcing is effected between two or more electrodes or between the electrode or electrodes and the metal in the collecting hearth. The size of the electrode opening or openings is determined in such a manner as to give the desired gas flow rate and linear velocity. The desired overall gas flow rate and linear velocity will vary according to the size of the furnace, the production capacity of the furnace, the nature of the particulate feed material and the nature of the gas. The electrodes are fastened in such a manner that the spacing for the arc may be adjusted for initiating arcing and maintaining the extended arc as well as to adjust the arc to compensate for consumption of the electrodes.

In addition to argon, various other gases may be used such as helium, nitrogen, carbon monoxide, methane, chlorine, etc., as well as mixtures thereof. However each gas differs somewhat in the effect produced and the appropriate rate of feed should be adjusted accordingly. The specific gas may be tested very easily to determine the appropriate rate of flow to produce the desired effect in stabilizing the extended arc.

The construction of the furnace proper may be similar to that of conventional arc furnaces using a refractory material where there will be exposure to extremely high temperatures or molten metal and where desired for extra strength an outer shell of steel or other appropriate metal may be used. The thickness of the refractory and the size of the furnace hearth will vary according to the design capacity of the furnace. Furnaces having capacities up to 400 tons of metal and even higher may be used. The power sources are similar to those used in other electric arc furnaces.

The invention is illustrated by the following examples which are intended merely for purpose of illustration and are not to be regarded as limiting the scope of the invention or the manner in which it may be practiced. Unless specifically indicated otherwise, parts and percentages are given by weight.

EXAMPLE I

A series of heats are performed in a small Detroit Rocking furnace having a design similar to that shown in FIGS. 1 and 2. The furnace is spherical in shape and has an inside diameter of 6-¼ inches. The electrodes are ¾ inch diameter graphite electrodes. One of the electrodes has an opening bored along its longitudinal axis and these tests are for determining the effect of variations in the size of this opening. An input is used of approximately 15 KW maximum from a 575 volt, single phase, 60 Hertz supply through a step down water-cooled transformer. The electrode adjustments are made manually and argon is the gas fed into the electrode opening. Since arc resistance is one of the most important criteria in furnace performance this is measured for different rates of gas flow and for variations in the electrode spacing. The results of three sets of tests with three different sizes of openings are reported below in Tables A, B and C. It is also noted that rate of electrode consumption is drastically reduced. For these particular flow rates the electrode opening of 0.0625 inch gives the best performance.

TABLE A

Diameter of electrode opening = 0.0320"
The gas used is argon.

| Gas Flow | Arc Length | Arc Current | Arc Voltage | Arc Power | Resist. of Arc |
|---|---|---|---|---|---|
| CFH | INCH | AMP | VOLTS | KW | OHMS |
| 1 |  | 240 | 58 | 14 | .242 |
| 3 |  | 244 | 62 | 15 | .254 |
| 5 |  | 280 | 57 | 15 | .22 |
| 7.5 | 1" | 280 | 60 | 15 | .214 |
| 10 |  | 280 | 60 | 15 | .214 |
| 15 |  | 280 | 57 | 15 | .22 |
| 3 |  | 220 | 69 | 14 | .314 |
| 5 |  | 196 | 72 | 14 | .368 |
| 7.5 |  | 204 | 72 | 14 | .353 |
| 10 | 2" | 220 | 69 | 14.75 | .314 |
| 15 |  | 235 | 68 | 15 | .288 |
| 3 |  | 140 | 82 | 10.5 | .585 |
| 5 | 3" | 144 | 80 | 12.0 | .555 |

TABLE B

Diameter of electrode opening is 0.0625"
The gas used is argon.

| Gas Flow | Arc Length | Arc Current | Arc Voltage | Arc Power | Resist. of Arc |
|---|---|---|---|---|---|
| CFH | INCHES | AMPS | VOLTS | KW | OHMS |
| 3 |  | 312 | 47 | 15.0 | .15 |
| 5 |  | 360 | 36 | 14.0 | .1 |
| 7.5 | 1" | 358 | 36 | 13.5 | .1 |
| 10 |  | 350 | 43 | 15.0 | .123 |
| 15 |  | 350 | 42 | 14.5 | .117 |
| 3 |  | 268 | 61 | 15 | .228 |
| 5 |  | 300 | 55 | 15 | .183 |
| 7.5 |  | 288 | 57 | 15 | .198 |
| 10 | 2" | 300 | 54 | 15 | .180 |
| 20 |  | 296 | 50 | 15 | .17 |
| 3 |  | 192 | 72 | 15.5 | .375 |
| 5 |  | 220 | 73 | 15 | .332 |
| 7.5 | 3" | 208 | 66 | 15 | .318 |
| 10 |  | 248 | 62 | 15.5 | .25 |
| 15 |  | 260 | 66 | 15.5 | .23 |
| 20 |  | 276 | 57 | 15.2 | .205 |

TABLE C

Diameter of electrode opening is 0.125"
The gas used is argon.

| Gas Flow | Arc Length | Arc Current | Arc Voltage | Arc Power | Resist. of Arc |
|---|---|---|---|---|---|
| CFH | INCHES | AMP | VOLTS | KW | OHMS |
| 3 |  | 208 | 68 | 13 | .327 |
| 5 |  | 288 | 62 | 15 | .216 |
| 7.5 | 1" | 350 | 56 | 15 | .187 |
| 10 |  | 296 | 52 | 15 | .176 |
| 15 |  | 296 | 50 | 15 | .169 |
| 20 |  | 320 | 46 | 15 | .144 |
| 5 |  | 160 | 80 | 15.5 | .5 |
| 10 | 2" | 260 | 60 | 15 | .231 |
| 15 |  | 284 | 59 | 15 | .206 |
| 20 |  | 292 | 56 | 15 | .194 |
| 3 |  | 160 | 80 | 13 | .5 |
| 5 |  | 192 | 72 | 14 | .375 |
| 7.5 | 3" | 200 | 72 | 15 | .36 |
| 10 |  | 200 | 72 | 14.5 | .36 |
| 15 |  | 188 | 74 | 14 | .394 |
| 20 |  | 188 | 74 | 14 | .294 |

EXAMPLE II

The furnace and conditions of Example I are used in a series of tests using an electrode having an opening of 0.0625 inch and variations in gas, gas flow rate and arc length. The results are tabulated below in Tables D–F.

TABLE D

NITROGEN

| Arc Length | Gas Flow | Arc Current | Arc Voltage | Arc Power | Arc Resist. |
|---|---|---|---|---|---|
| INCH | CFH | AMPS | VOLTS | KW | OHMS |
|  | 3 | 288 | 57 | 14.5 | .2 |
|  | 5 | 260 | 58 | 14.5 | .22 |
| 1" | 7.5 | 272 | 54 | 14.5 | .2 |
|  | 10 | 280 | 55 | 15 | .2 |
|  | 15 | 292 | 53 | 15 | .18 |
|  | 20 | 304 | 52 | 15 | .17 |
|  | 3 | 240 | 58 | 15 | .242 |
|  | 5 | 284 | 55 | 15 | .194 |
| 2" | 7.5 | 284 | 55 | 15 | .194 |
|  | 10 | 238 | 54 | 15 | .187 |
|  | 15 | 264 | 59 | 15 | .224 |
|  | 20 | 280 | 56 | 15 | .2 |
|  | 3 | 256 | 64 | 15 | .25 |
|  | 5 | 256 | 62 | 15 | .242 |
| 3" | 7.5 | 232 | 68 | 15 | .293 |
|  | 10 | 252 | 64 | 15 | .254 |
|  | 15 | 256 | 63 | 15 | .246 |
|  | 20 | 260 | 62 | 15 | .238 |

TABLE E

HELIUM

| Arc Length | Gas Flow | Arc Current | Arc Voltage | Arc Power | Arc Resist. |
|---|---|---|---|---|---|
| INCH | CFH | AMPS | VOLTS | KW | OHMS |
|  | 3 | 264 | 59 | 15 | .244 |
|  | 5 | 300 | 54 | 15 | .18 |
| 1" | 7.5 | 312 | 52 | 15 | .165 |
|  | 15 | 312 | 49 | 15 | .156 |
|  | 3 | 296 | 56 | 15 | .189 |
|  | 5 | 304 | 54 | 15 | .178 |
|  | 7.5 | 280 | 59 | 15 | .21 |
| 2" | 10 | 284 | 56 | 15 | .198 |
|  | 15 | 272 | 59 | 15 | .217 |
|  | 20 | 264 | 60 | 15 | .225 |
|  | 3 | 264 | 63 | 15 | .239 |
|  | 5 | 272 | 60 | 15 | .22 |
| 3" | 7.5 | 244 | 65 | 15 | .255 |
|  | 10 | 256 | 63 | 15 | .246 |
|  | 15 | 248 | 63 | 15 | .254 |
|  | 20 | 200 | 60 | 15 | .30 |

TABLE F

| Arc Length | Gas Flow | CARBON MONOXIDE | | | |
|---|---|---|---|---|---|
| | | Arc Current | Arc Voltage | Arc Power | Arc Resist. |
| INCH | CFH | AMPS | VOLTS | KW | OHMS |
| 3" | 3 | 248 | 65 | 15 | .262 |
| | 5 | 248 | 64 | 15 | .258 |
| | 7.5 | 260 | 61 | 15 | .235 |
| | 10 | 252 | 64 | 15 | .254 |
| | 15 | 220 | 70 | 15 | .318 |
| | 20 | 208 | 71 | 14.5 | .342 |
| 3¼" | 3 | 140 | 81 | 12.5 | .58 |
| | 5 | 186 | 76 | 14.5 | .41 |
| | 7.5 | 190 | 75 | 14 | .395 |
| | 10 | 196 | 71 | 14 | .368 |
| | 15 | 156 | 79 | 12 | .506 |
| 3¾" | 3 | 100 | 87 | 9.5 | .87 |
| | 5 | 148 | 80 | 13 | .54 |
| | 7.5 | 152 | 77 | 12.5 | .506 |
| | 10 | 156 | 76 | 12 | .497 |
| | 15 | 156 | 77 | 13 | .495 |
| | 20 | 156 | 78 | 11.5 | .5 |
| | 25 | 156 | 78 | 11.5 | .5 |
| | 30 | 148 | 79 | 12 | .534 |
| | 40 | 128 | 84 | 9.5 | .656 |

EXAMPLE III

A commercial electric arc furnace of 3 tons capacity and a power supply of about 2,000 kw at 25 hertz is modified in accordance with the design of this invention and operated to melt charges of iron metal. A ¼ inch diameter hole is drilled along the longitudinal axis of a number of 7-inch diameter graphite electrodes of 60-inch length. Six of these are coupled in pairs to assemble into three electrodes of 10 feet each and installed in the furnace with the outer ends connected to an argon supply with appropriate fittings. Five heats of approximately 2.96 tons each are made with the argon flow adjusted at 2 to 3-½ cubic feet per minute to give the most effective results. Flow at a rate of 1 cu. ft. per minute has little effect on the arc, and increasing the flow in excess of 4 cu. ft. per minute does not show any appreciable additional change. The results are compared with furnace operation using solid electrodes.

| | Solid Electrodes | Hollow Electrodes With Argon |
|---|---|---|
| Electrode Consumption (lbs. per ton) | 11 | 6 |
| Power Consumption (kw. hrs. per ton) | 604 | 567 |
| Arc Stability | — | Improved |
| Aver. Argon Consumption (cu. ft. per ton) | — | 40 |

There was an apparent reduction in the time required for melt-down and no arc flare or refractory wear observed. The more stable arc produced with the argon gave a more even and regular undulating pattern of power demand.

While I have described my invention by reference to certain embodiments and by the use of various examples, it is to be understood that the furnace and process herein disclosed and described may be utilized for the melting of metal, glass, and other materials and for various heat treatment of molten material involving modifications or reactions thereof without however departing from the spirit of my invention and the scope of the appended claims.

The invention claimed is:

1. A furnace adapted for the heat treatment of metallic or other material comprising
   1. a refractory-interlined vessel having one or more openings adapted to receive one or more electrodes extending into the interior of said vessel, a hearth therein adapted to receive said metallic material, an exit for the escape of gas, and a means for removing molten metal;
   2. one or more electrodes, at least one of which has an axial opening extending through at least a major portion of the length of said electrode and communicating with the interior of said vessel, said axial opening having a size predetermined to create a stabilized extended arc according to the flow rate and linear velocity of gas flowing through said opening;
   3. a means for supplying a selected gas to the axial opening in said electrode or electrodes whereby to feed said gas into the interior of said vessel; and
   4. a power supply connected to said electrode adapted to supply sufficient power to produce an extended arc between said electrode and one or more other electrodes or between said electrode and a charge of metallic material in said hearth and modulating said power by controlling the rate of gas flow and/or the gas composition to stabilize the said extended arc.

2. The furnace of claim 1 which includes a means for adjusting the position of said electrode or electrodes to lengthen the said arc.

3. A process for the melting of a metallic charge comprising the steps of
   1. positioning said charge below and in close proximity to an electrode having an axial opening therein extending to at least a major portion of the length of said opening;
   2. applying electrical power to said electrode of sufficient intensity to produce an arc between said electrode and a second electrode or between said electrode and said metallic charge;
   3. flowing a gas through a predetermined size opening of said electrode and into the interior of said arc and at a flow rate and linear velocity to create a stabilized extended arc;
   4. adjusting the position of said arc relative to said other electrode or said metallic charge so as to extend the length of said arc at least double the length of arc produced without the presence of said stabilizing gas flow.

4. The process of claim 3 in which said arc-stabilizing gas is argon.

5. The process of claim 3 in which said arc-stabilizing gas is nitrogen.

6. The process of claim 3 in which said arc-stabilizing gas is helium.

7. The process of claim 3 in which said arc-stabilizing gas is carbon monoxide.

8. The process of claim 3 in which said arc-stabilizing gas is methane.

* * * * *